United States Patent [19]

Else

[11] Patent Number: 4,614,007
[45] Date of Patent: Sep. 30, 1986

[54] CLAMPING MEANS FOR A STRAP

[75] Inventor: Robert F. Else, Nr. Southampton, United Kingdom

[73] Assignee: Britax (Wingard) Limited, Chichester, England

[21] Appl. No.: 771,254

[22] Filed: Aug. 30, 1985

[30] Foreign Application Priority Data

Oct. 2, 1984 [GB] United Kingdom ............. 8424853

[51] Int. Cl.⁴ ........................................... F16G 11/00
[52] U.S. Cl. ............................. 24/136 K; 24/136 R; 24/134 L; 403/374
[58] Field of Search ............ 24/136 K, 136 R, 136 L, 24/115 G, 115 H, 129 A, 129 W, 130, 134 L, 519, 664; 403/2, 374

[56] References Cited

U.S. PATENT DOCUMENTS

| 290,514 | 12/1883 | Baden | 24/134 L |
|---|---|---|---|
| 441,757 | 12/1890 | Gardner | 24/136 K |
| 1,087,093 | 2/1914 | Tarbox | 24/136 R |
| 1,449,945 | 3/1923 | Jacobsen | 24/134 L |
| 1,496,568 | 6/1924 | Vanderdonck | 24/134 L |
| 1,926,975 | 9/1933 | Endsor | 24/134 L |
| 2,062,894 | 12/1936 | Loos | 24/134 L |
| 2,446,253 | 8/1948 | Tresidder | 24/115 G |
| 2,482,231 | 9/1949 | White | 24/136 K |
| 3,654,672 | 4/1972 | Bullar | 24/136 K |
| 4,433,496 | 2/1984 | Jones et al. | 403/374 |

FOREIGN PATENT DOCUMENTS 2082892 6/1984 United Kingdom .
2101874 2/1985 United Kingdom .

Primary Examiner—Victor N. Sakran
Attorney, Agent, or Firm—Hayes, Davis & Soloway

[57] ABSTRACT

Clamping means for a strap comprises a support member having a concave surface and a guide member having a convex surface. The guide member is pivotally mounted on the support member for angular movement between a first position in which the concave and convex surfaces are spaced apart by a distance greater than the uncompressed thickness of the strap and a second position in which the concave and convex surfaces are spaced apart by a distance less than the uncompressed thickness of the strap. The guide member further comprises a lobe so positioned in relation to the convex surface that the length of the path of the strap extending from a first predetermined location, round the lobe and between the concave and convex surfaces (24, 48), to a second predetermined location decreases as the guide member pivots from its first position to its second position.

10 Claims, 6 Drawing Figures

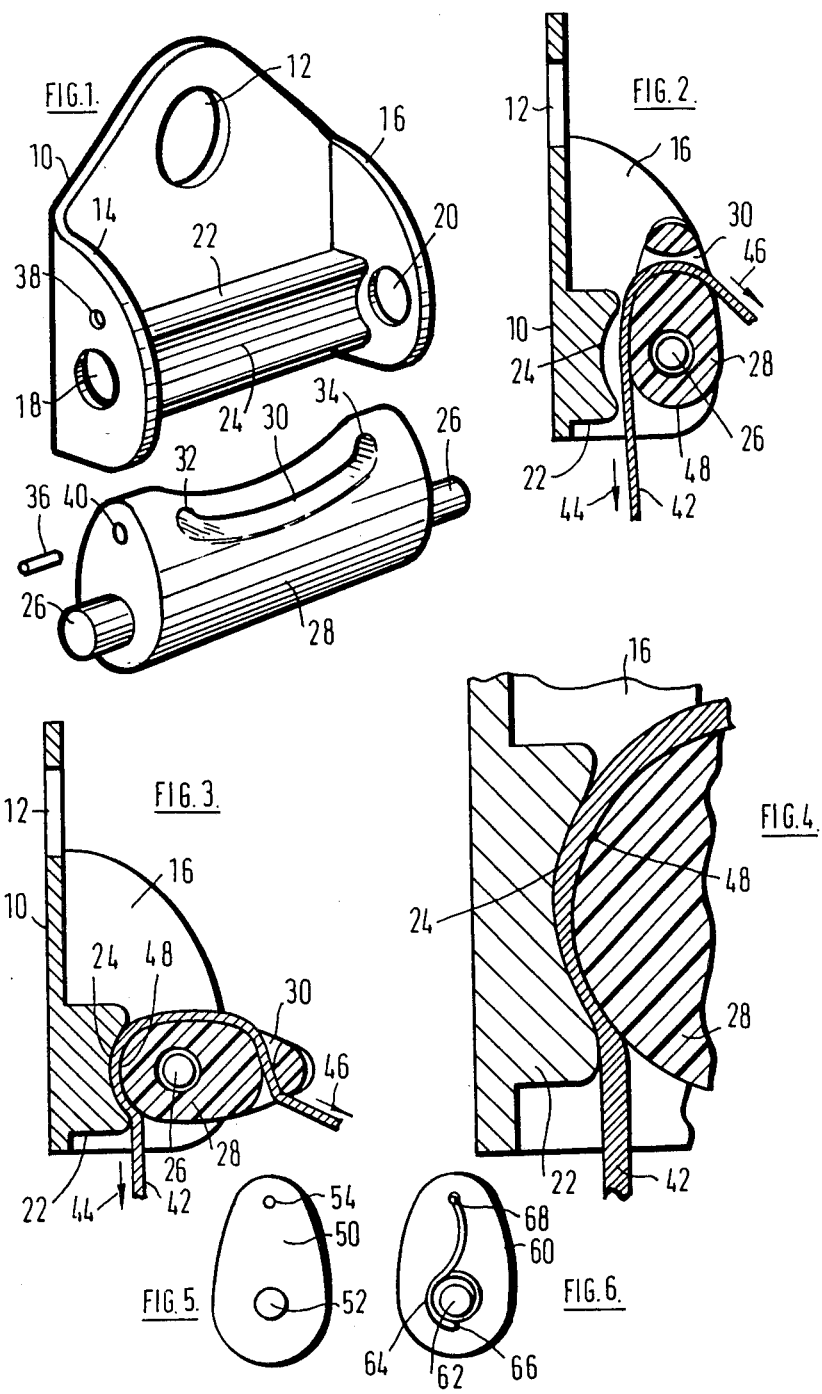

CLAMPING MEANS FOR A STRAP

This invention relates to clamping means for a strap and more particularly to clamping means arranged to be actuated when the tension in the strap exceeds a predetermined level.

According to the invention, clamping means for a strap comprises a support member having a concave surface and a guide member having a convex surface, pivotally mounted on the support member for angular movement between a first position in which the concave and convex surfaces are spaced apart by a distance greater than the uncompressed thickness of the strap and a second position in which the concave and convex surfaces are spaced apart by a distance less than the uncompressed thickness of the strap, the guide member further comprising a lobe so positioned in relation to the convex surface that the length of the path of the strap extending from a first predetermined location, round the lobe and between the concave and covex surfaces, to a second predetermined location decreases as the guide member pivots from its first position to its second position.

Thus, if the strap is in any way inhibited from moving past its second location in the direction of the guide member, tension applied at the first location will tend to pivot the guide member to its second position so as to clamp the strap and assist the aforesaid inhibition of movement.

In one form of the invention, the guide member is resiliently biased into its first position. Alternatively, the guide member may be secured in its first position by breakable or deformable means adapted to yield when the force tending to move the guide member into its second position exceeds a predetermined level.

Preferably, the distance between the convex and concave surfaces when the guide member is in its second position decreases along the path of the strap from the end nearer the second predetermined location to the end nearer the first predetermined location. This progressive narrowing of the gap results in a gradually increasing compressive force being applied to the strap, thus reducing the possibility of the strap tearing at the location where the clamping force is applied. The decrease in width of the gap is preferably arranged to take place uniformly, as the guide member moves towards its second position.

When the invention is applied to a vehicle safety belt system in order to relieve the load on an emergency locking retractor in the event that the vehicle is subject to sudden deceleration, for example in a collision, the guide member may conveniently be incorporated into the shoulder anchorage of the safety belt system, the second predetermined location being the emergency locking retractor itself or a further belt guide between the shoulder anchorage and the emergency locking retractor. The first predetermined location is the normal position of the shoulder of a seated user of the safety belt system.

The guide member may be provided with means for preventing lateral displacement of the strap relative to the lobe. For example such means may comprise projections extending from the lobe at each end of the guide member away from the pivotal mounting. The ends of such projections may be interconnected by a bridge formation so that one surface of the bridge formation and the confronting surface of the lobe together form a slot.

Embodiments of the invention will now be described, by way of example, with reference to the accompanying drawings, in which:

FIG. 1 is an exploded perspective view of a shoulder anchorage for a vehicle safety belt in accordance with the invention;

FIG. 2 is a cross-sectional view of the embodiment shown in FIG. 1 with the clamping means in their first position;

FIG. 3 is a cross-sectional view similar to FIG. 2 but showing the clamping means in their second position;

FIG. 4 is a fragmentary cross-sectional view showing the concave and convex surfaces of FIG. 3 on an enlarged scale; and FIGS. 5 and 6 are side views of alternative forms of one of the components of the embodiment illustrated in FIGS. 1 to 4.

Referring first to FIG. 1, a shoulder anchorage for a safety belt comprises a support member 10 having a hole 12 whereby it may be pivotally secured to the body of a motor vehicle. The support member 10 has side limbs 14 and 16 extending at right-angles to the central region thereof and having respective aligned holes 18 and 20 therein. Between the two limbs 14 and 16, the support member carries an anvil 22 having a concave cylindrical surface 24 with its axis located below the common axis of the aligned holes 18 and 20.

A steel shaft 26 is journaled in the holes 18 and 20. Mounted on the shaft 26 is a guide member 28 which is moulded from plastics material and is of irregular curved cross-section somewhat similar to that of an egg with the shaft 26 nearer to the thicker end. A slot 30 extends through the thinner end of the guide member 28, the length and thickness of the slot 30 being sufficient for the strap of a vehicle safety belt to pass freely therethrough. The slot 30 is curved so that its central region is closer to the shaft 26 than its ends, the radius of curvature near each of the ends 32 and 34 being substantially greater than that of the rest of the slot. This configuration encourages the strap to remain centrally located within the slot 30.

Referring now to FIG. 2, in normal use the guide member 28 is oriented with the slot 30 extending horizontally and positioned above the axle 26. The guide member 28 is held in this position by a shear pin 36 (FIG. 1) which engages in a hole 38 in the limb 14 of the support member 10 and in a corresponding hole 40 in the guide member 28. A strap 42 of a vehicle safety belt extends from an emergency locking retractor (now shown but located in the direction indicated by the arrow 44) between the guide member 28 and the concave surface 24 of the anvil and thence through the slot 30 and, in the direction indicated by the arrow 46, towards the shoulder of a user. It will be observed that the strap 42 does not touch any part of the concave surface 24 and consequently the friction is restricted to that produced by the surface of the guide member 28. Because of the eccentric location of the axle 26 relative to the guide member 28, tension in the strap 42 will tend to rotate the guide member 28 in the clockwise direction (as viewed in FIG. 2) but this movement is prevented by the shear pin 36.

Turning now to FIG. 3, if sufficient tension is applied to the strap 42 to cause the shear pin 36 to break, the guide member 28 pivots to the position shown in FIG. 3 in which the convex surface 48 of its broader end wedges the strap 44 against the concave surface 24 of the anvil 22. As can be seen from FIG. 4, the shapes of the concave surface 24 and the convex surface 48 are so related to one another that the gap therebetween is narrowest at its lower end and widens progressively. This has the result that the compressive force applied to the strap 42 increases progressively in the direction towards the emergency locking retractor. Consequently, there is no point at which the strap is subject to a "chopping" action which could cause it to tear.

The use of the shear pin 36 or a similar breakable device to hold the guide member 28 in the position illustrated in FIG. 2 has the advantage that a safety belt installation which has been subject to sufficient load to break the pin requires replacement, thus avoiding the risk of a weakened safety belt system remaining in service.

If the strap clamp is intended to operate at a lower load than that at which it would be considered necessary for the complete system to be replaced, the guide member 28 of FIGS. 1 to 4 may be replaced by a guide member 50 as illustrated in FIG. 5. The guide member 50 has a hole 52, by means of which it may be journaled on the shaft 26, and a spring-loaded detent 54 positioned to engage in the hole 38 (FIG. 1) in the side limb 14 of the support member 10. The shear pin 36 is omitted. The guide member 50, which is identical with the guide member 28 in all other respects with the guide member 28, has to be returned manually to the equivalent position to that illustrated in FIG. 2. If such return is required to take place automatically, a guide member 60, as illustrated in FIG. 4, may be used. The guide member 60 has a hole 62, by means of which it may be journaled on the shaft 26. A coil spring 64 is located round the shaft 26 and has one end engaging in a hole 66 in the guide member 60, and the other end 68 positioned to engage in the hole 38 (FIG. 1) in the side limb 14 of the support member 10, so as to bias the guide member 60 into the equivalent position to that shown in FIG. 2.

I claim:

1. Clamping means for a strap comprising a support member having a concave surface, a guide member having a convex surface and blocking means for controlling movement of the guide member relative to the support member, the guide member being pivotally mounted on the support member for angular movement between a first position in which the concave and convex surfaces are spaced apart by a distance greater than the uncompressed thickness of the strap and a second position in which the concave and convex surfaces are spaced apart by a distance less than the uncompressed thickness of the strap, the guide member further comprising a lobe so positioned in relation to the convex surface that the length of the path of the strap extending from a first predetermined location, round the lobe and between the concave and convex surfaces, to a second predetermined location decreases as the guide member pivots from its first position to its second position and the blocking means being arranged to retain the guide member in its first position until tension in the strap exceeds a predetermined value.

2. Clamping means according to claim 1, wherein the blocking means comprises means for resiliently biasing the guide member into its first position.

3. Clamping means according to claim 1, wherein the blocking means comprises frangible means adapted to secure the guide member in its first position.

4. Clamping means according to claim 1, wherein the distance between the convex and concave surfaces when the guide member is in its second position decreases along the path of the strap from the end nearer the second predetermined location to the end nearer the first predetermined location.

5. Clamping means according to claim 4, wherein the decrease in width of the gap is arranged to take place uniformly, as the guide member moves towards its second position.

6. Clamping means according to claim 1, wherein the guide member is provided with means for preventing lateral displacement of the strap relative to the lobe.

7. Clamping means according to claim 6, wherein said means for preventing lateral displacement comprises projections extending from the lobe at each end of the guide member away from the pivotal mounting.

8. Clamping means according to claim 7, wherein the ends of said projections are interconnected by a bridge formation so that one surface of the bridge formation and the confronting surface of the lobe together form a slot.

9. Clamping means according to claim 8, wherein the said slot is curved with the central region thereof closest to the axis of the pivotal mounting.

10. Clamping means according to claim 1, wherein the support member and guide member together comprise the shoulder anchorage of a vehicle safety belt system.

* * * * *